April 5, 1927. Re. 16,587

H. C. GUSTAFSON

TOOL RETAINER

Original Filed Oct. 10, 1921

Inventor

Hjalmer C. Gustafson,

By

Attorney

Reissued Apr. 5, 1927. Re. 16,587

UNITED STATES PATENT OFFICE.

HJALMER C. GUSTAFSON, OF DENVER, COLORADO, ASSIGNOR TO THE DENVER ROCK DRILL MANUFACTURING COMPANY, OF DENVER, COLORADO, A CORPORATION OF DELAWARE.

TOOL RETAINER.

Original No. 1,580,599, dated April 13, 1926, Serial No. 506,731, filed October 10, 1921. Application for reissue filed December 21, 1926. Serial No. 156,241.

The present invention relates to tool retainers for rock drills and the like, the object being to provide a novel device of this character, so constructed that the tool-retaining means is housed, thereby protecting the same against external injury, and yet being readily operable to release the tool.

In the accompanying drawings:—

In the embodiment disclosed the front head of a hammer drill is shown at 6, and contains the usual tool holder in the form of a rotatable chuck 7 actuated by the piston hammer 8, and having a bore or socket 9 to receive the tool. A portion of said tool in the form of a drill steel is illustrated at 10, said steel having a collar 11 thereon.

Figure 1:
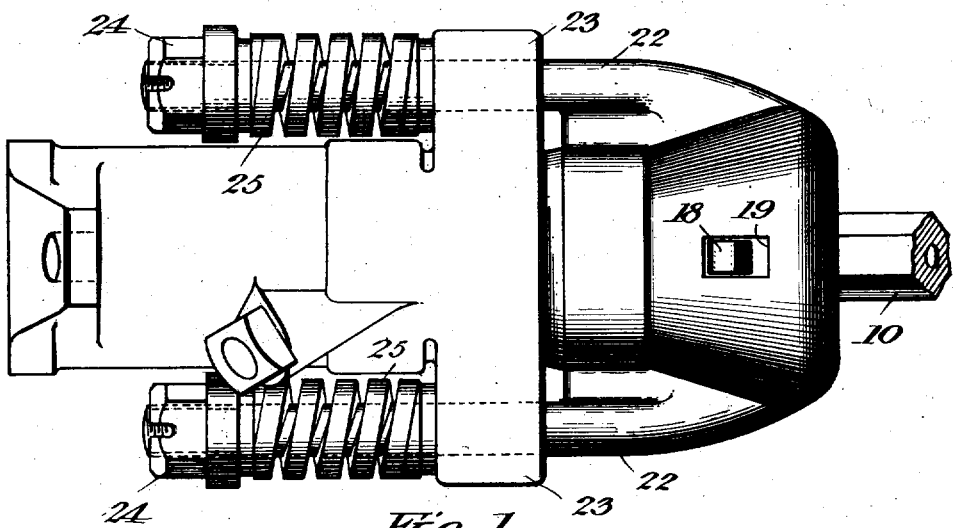
Figure 1 is a plan view of the preferred embodiment of the invention.
Figure 2:
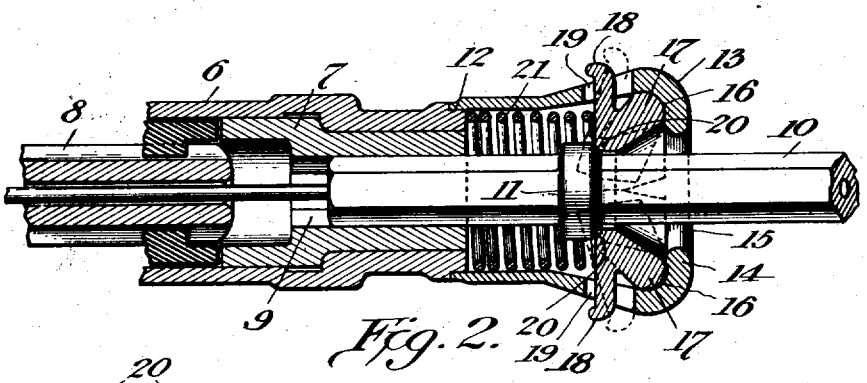
Figure 2 is a longitudinal sectional view therethrough.
Figure 3:
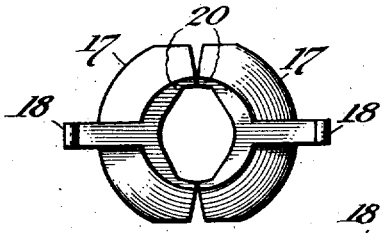
Figure 3 is a front elevation of the holding dog.
Figure 4:
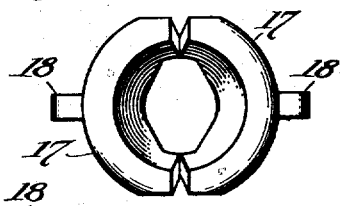
Figure 4 is a rear elevation of the same.
Figure 5:
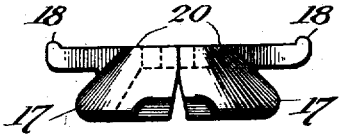
Figure 5 is a plan view of said holding dog.

The front end of the head 6 is reduced, as shown at 12 to form an annular seat that receives the rear end of a hood or housing 13. The front wall 14 of said hood or housing has an opening 15 to permit the passage of the steel 10 into the socket 9, and this opening is of sufficient size to also permit the passage of the collar 11. The inner front end of the housing is provided with rounded seats 15, against which knuckle holding dogs 17 having outstanding finger pieces 18 that pass through openings 19 formed in opposite sides of the hood or housing. These dogs incline inwardly and rearwardly and terminate in abutment shoulders 20 that are adapted to engage the front side of the steel collar 11. A coiled spring 21 is located in the hood or housing and is interposed between the dogs and the front end of the head 6, the spring as clearly shown in Figure 2 surrounding the steel and bearing against both dogs.

It will be clear that with this conctruction the drill steel can be passed through the opening 15 and into the socket 9 of the chuck 7. The collar 11 forces the dogs apart and said dogs seat against the steel in advance of the collar. The steel is thus automatically locked in place, but is permitted to have the necessary play. To detach the steel it is only necessary to move the finger pieces forwardly, whereupon the dogs will swing outwardly, as indicated in dotted lines and permit the collar to pass between them.

The mounting for the hood 13 comprises rearwardly extending rods 22 forming a part of said hood and slidably engaging in oppositely projecting ears 23 formed on the front end of the tool holder 6. These rods have retaining nuts 24 on their rear ends and interposed between said nuts and ears 23 are relatively heavy springs 25 that serve to yieldingly hold the hood in its rearmost position and yet permit a yielding forward movement thereof.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim is:

1. The combination with a tool holder having a socket in its front end and outstanding side ears, a hood in advance of the holder having an opening alined with the socket and rearwardly extending rods slidable in the ears, springs on the rods for urging the hood rearwardly, dogs pivotally mounted in the hood and having projecting operating means, said dogs having bearings at their front ends against the hood and having abutment shoulders in rear of said bearings for engagement with the front face of the collar of the tool placed in the sockets, and a coiled spring in the hood interposed between the dogs and holder.

2. The combination with a tool holder having a tool-receiving socket, of a hood mounted on the front end of the holder and having a front wall provided with an opening through which the tool passes, and holding dogs pivotally bearing against the front wall of the hood on opposite sides of the opening, said dogs having operating means projecting from the hood and having abutment faces at their rear ends for engagement with the front face of the collar of a tool placed in the socket.

3. The combination with a tool holder having a tool-receiving socket, and oppositely projecting ears, of a hood having rearwardly extending rods slidable in the ears, retaining devices on the rear ends of the rods, coiled springs on the rods between the ears and retaining devices, said hood having a front wall provided with an opening through which the tool passes, holding dogs pivotally bearing at their front ends against the front wall of the hood on opposite sides of the opening, said dogs having operating means projecting from the hood and having their rear ends provided with abutment faces to engage the front face of the collar of a tool placed in the socket, and a coiled spring interposed between the rear ends of the dogs outside the abutment faces and the front end of the tool holder and serving to hold said dogs in their forward and inner positions.

4. The combination with a tool holder having a tool receiving socket, of a hood mounted on the front end of the holder and having a tool-receiving opening alined with the socket, said hood having a front rounded wall constituting pivot bearings, holding dogs within the hood having rounded front ends pivotally engaged in the bearings and having elements projecting outwardly from their rear ends and through the hood, the rear ends of said dogs being provided with abutment faces for engagement with the front face of the collar of a tool placed in the socket, and spring means for normally holding the dogs in their innermost relation.

5. The combination with a fluid operated hammer, of a tool holder having a socket to receive the tool operated on by the hammer, a hood mounted on the front end of the holder and having a front inturned wall provided with a tool-receiving opening alined with the socket, said wall having its inner face rounded to form pivot bearings, and holding dogs within the hood having their front ends rounded and seated against the pivot bearings, said dogs having shoulders that are adapted to engage the front of the collar of a tool placed in the tool holder and being adapted to swing outwardly to permit the passage of said collar.

6. The combination with a fluid operated hammer, of a tool holder having a socket to receive the tool operated on by the hammer, a hood mounted on the front end of the holder and having a front inturned wall provided with a tool-receiving opening alined with the socket, said wall having its inner face rounded to form pivot bearings, holding dogs within the hood having their front ends rounded and seated against the pivot bearings, said dogs having shoulders that are adapted to engage the front of the collar of a tool placed in the tool holder and being adapted to swing outwardly to permit the passage of said collar, means engaged with the dogs and projecting from the hood to swing said dogs, and a coiled spring interposed between the dogs and the tool holder and of sufficient diameter to receive the tool and its collar.

In testimony whereof I affix my signature.

H. C. GUSTAFSON.